United States Patent [19]

von Meyerinck et al.

[11] Patent Number: 4,658,873
[45] Date of Patent: Apr. 21, 1987

[54] FUELING SYSTEM, IN PARTICULAR FOR AIRCRAFT FUELING

[76] Inventors: Wolfgang von Meyerinck, Espenstrasse 5, D-6306 Langgoens; Dietz von Meyerinck, Arnsburger Strasse 14, D-6302 Lich 2, both of Fed. Rep. of Germany

[21] Appl. No.: 873,071

[22] Filed: Jun. 2, 1986

Related U.S. Application Data

[63] Continuation of Ser. No. 684,564, Dec. 21, 1984, abandoned.

[30] Foreign Application Priority Data

Jul. 4, 1984 [EP] European Pat. Off. ........ 84107766.2

[51] Int. Cl.⁴ ........................... B65B 3/04; B67D 5/70
[52] U.S. Cl. ..................................... 141/387; 141/279; 137/615; 285/162; 285/168
[58] Field of Search ................. 141/258–284, 141/384, 388, 387, 389; 137/615; 285/162, 168

[56] References Cited

U.S. PATENT DOCUMENTS

| 1,885,886 | 11/1932 | Banks | 144/250 |
|---|---|---|---|
| 2,531,001 | 11/1950 | Short | 222/176 |
| 2,642,311 | 6/1953 | Beyer | 299/47 |
| 2,953,161 | 9/1960 | Muller | 137/615 |
| 3,724,499 | 4/1973 | Huniu | 137/615 |
| 3,891,004 | 6/1975 | Knight | 137/615 |
| 4,130,134 | 12/1978 | Castle | 141/387 |

FOREIGN PATENT DOCUMENTS

| 2452177 | 5/1976 | Fed. Rep. of Germany . |
| 2234221 | 1/1975 | France . |
| 456906 | 11/1936 | United Kingdom . |
| 1587114 | 4/1981 | United Kingdom . |

Primary Examiner—Houston S. Bell, Jr.
Attorney, Agent, or Firm—Flynn, Thiel, Boutell & Tanis

[57] ABSTRACT

A fueling system includes a hydrant coupling and a filler-neck coupling which can respectively be connected to a supply line and a tank which is to be refueled or emptied without the need of using hoses. The filler-neck coupling can have any desired orientation in space without handling difficulties, and the fueling system has nominal diameters of 4″ or more and thus permits quick fueling. The system includes a center and two outer pipe sections connected by two pairs of swivel joints. The center pipe section is carried at its ends by carriages and has bent ends which each have thereon a respective swivel joint of each pair, the swivel joints of each pair having perpendicular axes. The outer pipe sections are also carried by carriages and each have at the outer end thereof an end swivel joint with an axis perpendicular to the associated outer pipe section. One of the end swivel joints is connected to a hydrant coupling arrangement and the other to a head piece which includes the filler-neck coupling.

22 Claims, 10 Drawing Figures

FUELING SYSTEM, IN PARTICULAR FOR AIRCRAFT FUELING

This application is a continuation of U.S. Ser. No. 684,564, filed Dec. 21, 1984, now abandoned.

FIELD OF THE INVENTION

This invention relates to a fueling system and, more particularly, to a system having a hydrant coupling which can be connected to a supply line and a filler-neck coupling which can be connected to a tank which is to be refueled or emptied, in particular for aircraft fueling.

BACKGROUND OF THE INVENTION

During the fueling of vehicles, in particular aircraft used for military purposes, large amounts of fuel must be moved quickly from a hydrant system into the tank of the aircraft or into a tank vehicle. For removing the fuel from the hydrant and filling tank cards or aircraft, it is known to use flexible hoses which, at their ends, are provided with couplings for the connections to the hydrant and aircraft tank. These hoses have nominal diameters of 2½ to a maximum of 3", as a result of which the handling of these hoses becomes more difficult and complicated as the nominal diameter and length of the hoses are increased. One is therefore forced in the case of lengths above 20 meters to use hoses with smaller diameters since, due to their weight, they can be handled only with great difficulty. A transport of such a hose from one hydrant connection to the next is, as a rule, hardly possible in the unrolled condition, because then the hose must be pulled over the ground, which not only requires a lot of energy, but also adversely affects the durability of the hose. Insofar as the hoses are stored in fueling chutes, they are exposed to additional wear because, when pulling the hoses out of the chute, they are pulled across the edge of the chute. Aside from such mechanical damage, the hoses are also subject to a relatively rapid aging process, so that they must be periodically replaced.

A further disadvantage during the use of a hose is that it can be used only to a limited extent for defueling, and then only when specially manufactured. Moreover, the emptying of the hose is possible only by lifting it, which in practice means a disadvantage. In particular, it has been found during use of hoses, particularly hoses with large nominal diameters, that on one hand the coupling of the hose to the tank coupling is possible only with great effort because of the high weight and that, on the other hand, the tank coupling is subjected to a high moment by the hose. All of the foregoing reasons show that, with conventional fueling systems, the fueling time can hardly be reduced where flexible hoses must be used.

Furthermore, so-called hydrant cars are known which have fueling fittings which, through hoses, can be connected to the hydrant and to the filler-neck coupling of the aircraft. The disadvantage of these hydrant cars is that, on one hand, they require the hoses having the aforementioned disadvantages and, on the other hand, they require external energy for winding up of the hoses and increasing the pressure in hose lines with a small cross-section.

A basic purpose of the invention is to provide a fueling system of the above-mentioned type which has the flexibility required for connecting the filler-neck coupling to the tank coupling with any desired orientation in space, which can be connected without handling difficulties even with a nominal diameter of 4' or more to the tank coupling, which is not exposed to significant wear, which can be transported in a simple manner from one hydrant to another, which requires minimal maintenance, which can be utilized practically indefinitely, which is usable for both refueling and defueling, and which can be stored in a small space during nonuse.

SUMMARY OF THE INVENTION

This purpose is attained by providing a fueling system which includes a center and two outer pipe sections, wherein one of the two outer pipe sections is connected to the head piece with the filler-neck coupling and the other to the hydrant coupling. The center pipe section is provided with two carriages, advantageously in the region of its ends, so that it serves as a travel-sturdy unit, and has connected thereto the two outer pipe sections which at the same time are each supported by a transport wheel or a transport carriage relative to the ground. The outer pipe sections are each connected to the center pipe section by a pair of swivel joints, wherein the axes of rotation of the swivel joints of each pair are perpendicular to one another, so that the outer pipe sections can each be swung about both horizontal and vertical axes with respect to the center pipe section. At the outer end of each outer pipe section there is arranged an end swivel joint, the axis of rotation of which is substantially vertical, so that the hydrant coupling arrangement and the head piece with the filler-neck coupling are swingable in horizontal directions with respect to the associated outer pipe section.

An end piece of the hydrant arrangement includes two pipe sections which are connected by a swivel joint having an axis perpendicular to that of the end swivel joint of the associated outer pipe section. The hydrant coupling is in turn connected to one of the pipe sections of the end piece by a swivel joint having an axis of rotation which is parallel to the axis of rotation of the adjacent swivel joint. Through this, the hydrant coupling can be easily connected to various hydrants arranged at different heights above the ground.

A head piece of the inventive fueling system includes five pipe sections which are connected by four swivel joints which each have only one degree of freedom, so that the filler-neck coupling which is provided at one end of the head piece can assume any desired orientation in space. For this purpose, these four swivel joints and the swivel joint connecting the head piece to the nearest outer pipe section are arranged so that three have axes of rotation parallel to one another while the remaining two have axes of rotation perpendicular to the other three. Through this arrangement of the five swivel joints, it is possible to swing the tank coupling to all orientations in space, so that its coupling surface can always be alinged as required for example parallel to an aircraft filler-neck adapter, whereby connection to the aircraft adapter is possible without a transfer of any moment thereto. In order to make handling of the head piece easier, two adjacent pipe sections thereof, one of which is connected to the fueling system by a swivel joint having a vertical axis of rotation, are connected to a balance mechanism having an adjustable spring package which supports the weight of the pipe sections and swivel joints of the head piece, so that the filler-neck coupling can be held at any orientation in space with little or no external force. Through this, it is assured that, even in the case of large nominal diameters and pipes which are under pressure, an effortless handling and connecting of the head piece is possible.

For easier handling of both the head piece and the end part of the hydrant arrangement, a balance unit is connected between the first swivel joint which permits a vertical rotary movement and an adjacent pipe section, and this balance unit, in the simplest case, includes a spring package and a pull rod and supports the weight of the end part or the head piece so that the hydrant coupling or filler-neck coupling can be almost effortlessly manipulated. Through the capability to align the tank coupling in any orientation in space, it can be connected moment-free to the corresponding tank coupling. Moreover, the weight of the head piece or the end part is supported by the balance unit, so that the tank or hydrant coupling is not stressed by the fueling system. Regarding freedom of the fueling system from wear, the pipe sections can be manufactured of a rust-free material which makes them resistant to outer and inner influences. Maintenance can be limited to those occasions on which the couplings must be serviced.

The center and outer pipe sections of the fueling system are designed with approximately equal lengths, so that they can be swung parallel to one another by means of the swivel joints to thus permit the fueling system to be collapsed to approximately the length of one such section, namely, in the case of three main pipe sections, to approximately one third of its maximum length. Regarding transport of the fueling system from one hydrant to the next, according to a further suggestion a pull member with a pull coupling is arranged on the fueling system, so that the fueling system can be pulled as a multi-jointed trailer from one hydrant to the other. The wheels are trailing wheels, of which at least two can be locked in a given position.

The requisite fittings or instruments such as a hydraulic filler valve, a volume counter, a Venturi pipe or a pressure-compensating arrangement can be provided in the pipe sections of the fueling system, wherein the pressure-compensating arrangement should assure a relief of the fueling system both from an underpressure and also excessive pressure. Such a pressure-compensating arrangement is necessary in order to protect the constantly filled fueling system, which is normally stored outside and thus exposed to the hot sun and great coldness, against damage.

BRIEF DESCRIPTION OF THE DRAWINGS

One exemplary embodiment of the invention will be described in greater detail hereinafter in connection with the drawings, in which.

DETAILED DESCRIPTION

Figure 1:
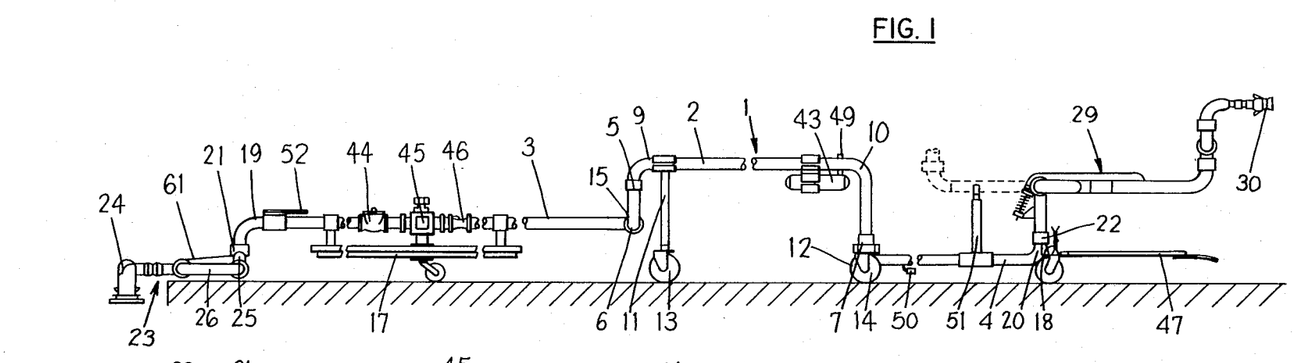
FIG. 1 is a side view of a fueling system embodying the invention.
Figures 2, 3:
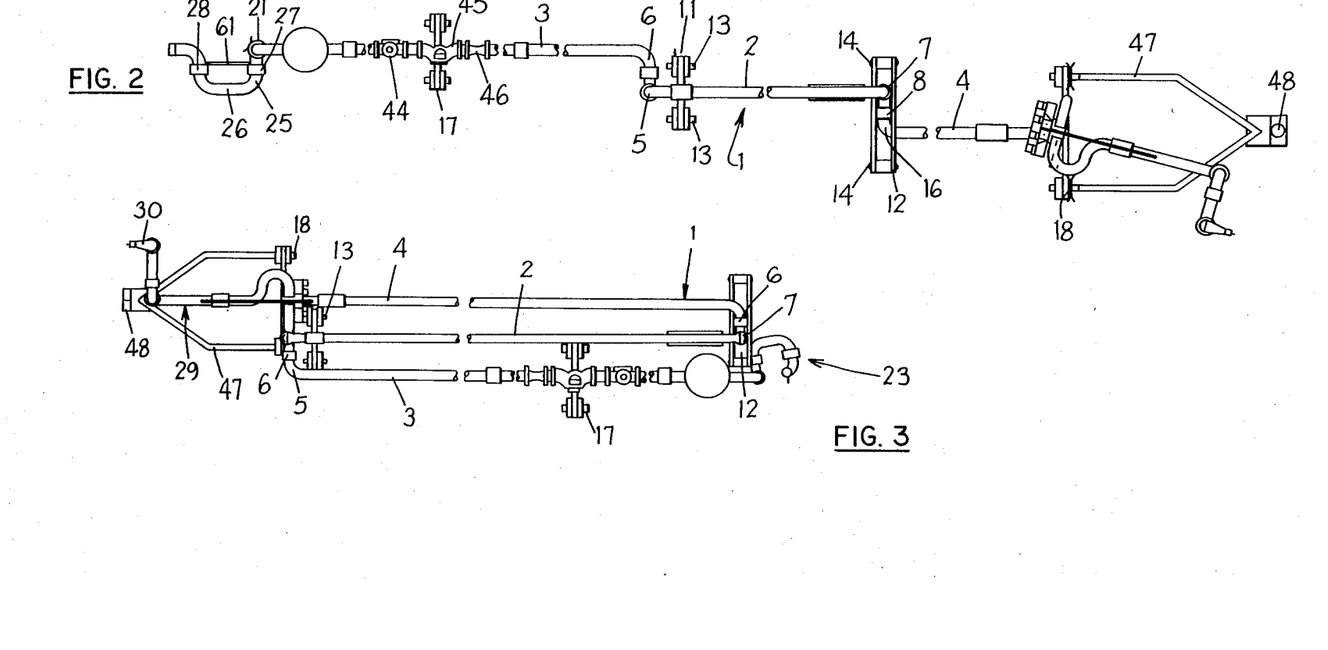
FIG. 2 is a top view of the fueling system of FIG. 1.
FIG. 3 is a top view of the fueling system according to FIGS. 1 and 2 in a collapsed contition.

The fueling system 1 which is illustrated in FIGS. 1 to 3 has a center pipe section 2 and two outer pipe sections 3 and 4 which are connected to the center pipe section 2 by respective pairs of swivel joints 5, 6 and 7, 8. The ends 9 and 10 of the center pipe section 2 are curved downwardly, so that the swivel joints 5 and 7 each have a vertical axis of rotation. The outer pipe sections 3 or 4 can be pivoted in a horizontal direction about the swivel joints 5 or 7. The swivel joints 6 and 8 permit swinging of the outer pipe sections 3 and 4 in a vertical plane so that, through this, ground irregularities can be balanced.

Two carriages 11 and 12 each having wheels 13 and 14, are arranged at respective ends of and support the center pipe section 2.

The two swivel joints 5 and 6 and the two joints 7 and 8 are each connected by a respective angularly curved pipe section 15 or 16. The two outer pipe sections 3 and 4 are each supported on the ground by means of a respective carriage 17 or 18, so that swivel joints or pivot bearings 21 and 22 respectively arranged at the angularly bent ends 19 and 20 of the outer pipe sections 3 and 4 are also supported, wherein the axis of rotation of each of the end pivot bearings 21 and 22 is perpendicular to the axes of rotation of the joints 6 and 8, namely, they are substantially vertical when the ground is horizontal.

An end part 23 is connected to the pivot bearing 21 and carries a hydrant coupling 24. The end part 23 includes two pipe sections 25 and 26 which are connected with one another by a pivot bearing or swivel joint 27, the axis of rotation of which is perpendicular to that of the pivot bearing 21. A further swivel joint 28 is arranged at the end of the pipe section 26, the axis of rotation of which is parallel to the axis of rotation of the pivot bearing 27. The hydrant coupling can be connected to various hydrants at different levels above the ground as a result of the pivot bearings 27 and 28.

Figure 4:
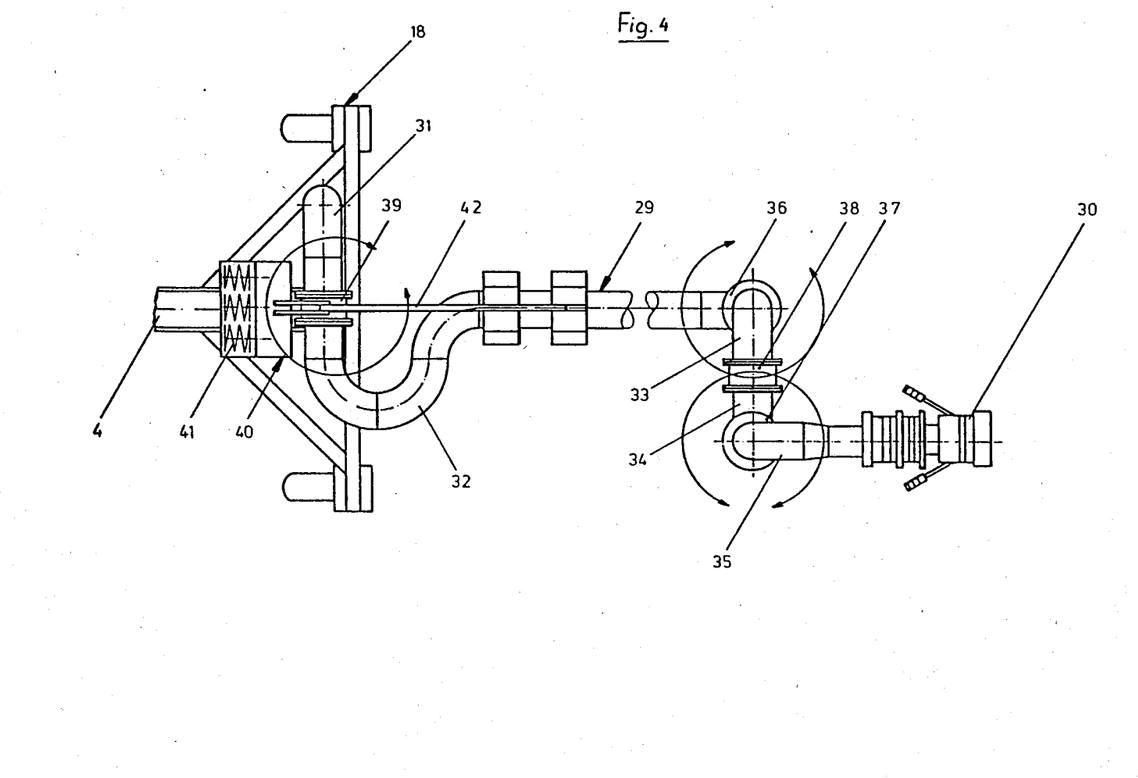
FIG. 4 is a top view of a head piece of the fueling system.
Figure 5:
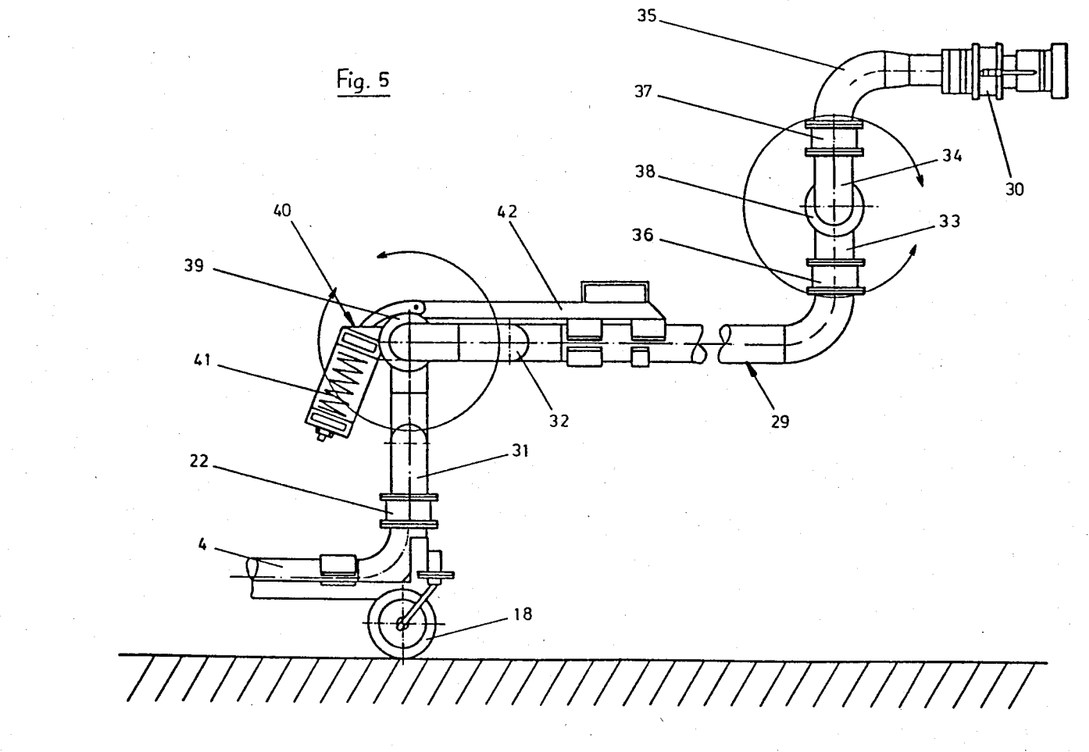
FIG. 5 is a side view of the head piece of FIG. 4.
Figure 6:
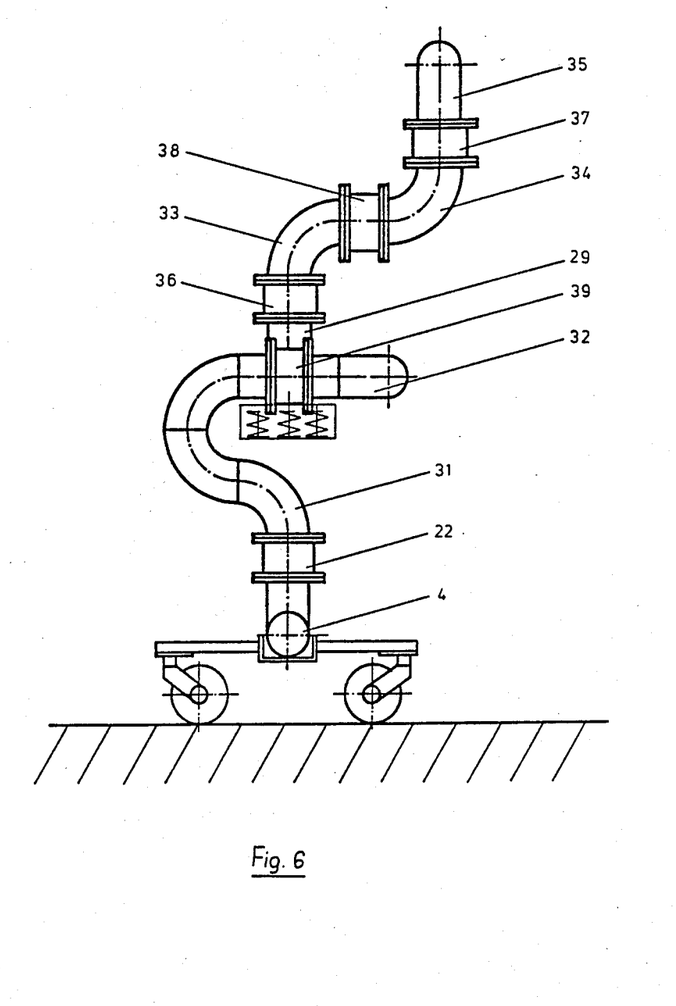
FIG. 6. is an end view of the head piece of FIGS. 4 and 5.

A head piece 29 which carries a filler-neck coupling 30 is connected to the pivot bearing 22, the axis of rotation of which is parallel to the axis of rotation of the bearing 7 when the ground is level. The head piece 29, which in FIGS. 4 and 5 is shown in an enlarged scale, includes five pipe sections 31–36, wherein the filler-neck coupling 30 is secured on the pipe section 35.

The axes of rotation of two joints 37 and 36, which are respectively connected between pipe sections 34 and 35 and pipe sections 32 and 33, lie in planes which are parallel to one another. A swivel joint 38 is arranged between the swivel joints 36 and 37 and has an axis of rotation in a plane which is perpendicular to the axes of the two joints 36 and 37. A swivel joint 39 connects the two pipe sections 31 and 32 and has an axis of rotation which is perpendicular to the axis of rotation of the swivel joint 22. This special arrangement of the joints makes it possible to position the filler-neck coupling 30 in any desired orientation in space without applying a moment to the filler-neck coupling 30.

A balance unit 40 which includes a spring package 41 and a diagonal tie 42 is connected to the two pipe sections 31 and 32 which are pivotally connected by the joint 39. The initial tension of the spring package 41 can be adjusted to a value which balances the weight of the head piece 29, so that the filler-neck coupling 30 will maintain a given position in space, or can be moved, with little or no force applied thereto.

A pressure-compensating system 43 is connected to the center pipe section 2 and, when a specified pressure in the fueling system is exceeded, effects a pressure reduction and also, when a pressure below a specified value occurs in the fueling system, assures a pressure compensation.

Other fittings or instruments which are needed for the fueling system are also arranged in the pipe section 3, for example a hydraulic filler valve 44, a volume counter 45 and a Venturi pipe 46.

A pull member 47 with a pull coupling 48 is connected to the carriage 18 which supports the front pipe section 4, which pull coupling permits the coupling of the fueling system to a tractor, so that it can be moved in an effortless manner from one hydrant to another.

FIG. 3 illustrates the fueling system 1 in a collapsed condition. The three pipe sections 2, 3 and 4 extend parallel to one another, so that the fueling system can be stored in a relatively small area, compared with its full length. The pipe sections 2, 3 and 4 can, if desired, be releasably secured to one another, so that the fueling system can be easily transported in its collapsed condition.

An escape valve 49 is provided in the pipe section 2 and, during filling of the fueling system, is used to permit air therein to escape. The escape valve 49 is advantageously provided at the highest point of the fueling system. Furthermore, a discharge valve 50 is advantageously arranged at the lowest point of the fueling system, through which the fueling system can be emptied.

During transport of the fueling system, the head piece 29, as shown in broken lines in FIG. 1, is tilted backwardly and is secured on a support 51. Furthermore, a fastening mechanism 52 is provided on the pipe section 3 and can hold the hydrant coupling 24 in an upwardly tilted position thereof. Furthermore, locking mechanisms for the pipe sections 2, 3 and 4 can be provided to secure these sections to one another in the position which is shown in FIG. 3, so that transport using the pull member 47 can be carried out in the most compact possible configuration of the fueling system 1.

At lease six of the eight wheels of the fueling system are trailing wheels. Of these wheels, at least two are lockable, so that a steady trailing of the fueling system during transport is obtained.

Figure 7:
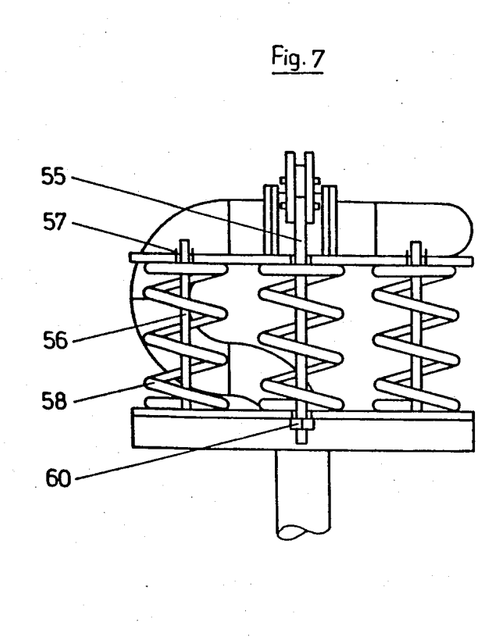
FIG. 7 is an end view of a portion of the fueling system of FIG. 1.
Figure 8:
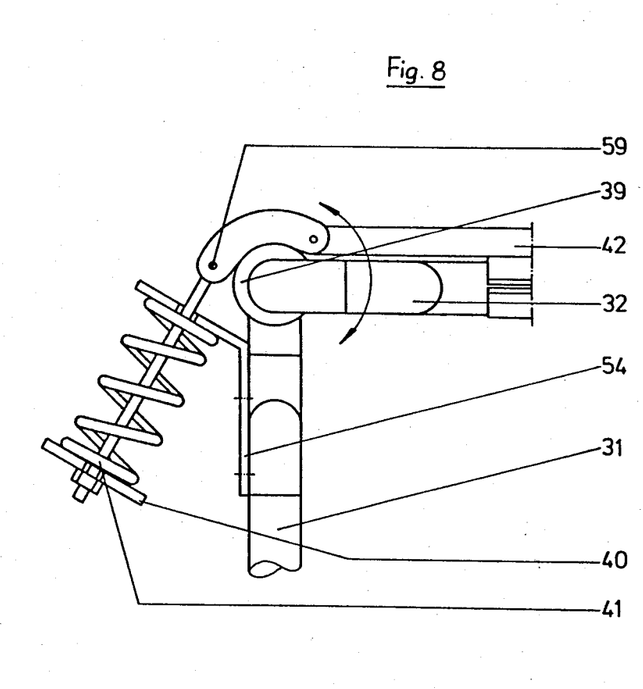
FIG. 8 is a side view of a portion of the fueling system of FIG. 1.
Figure 9:
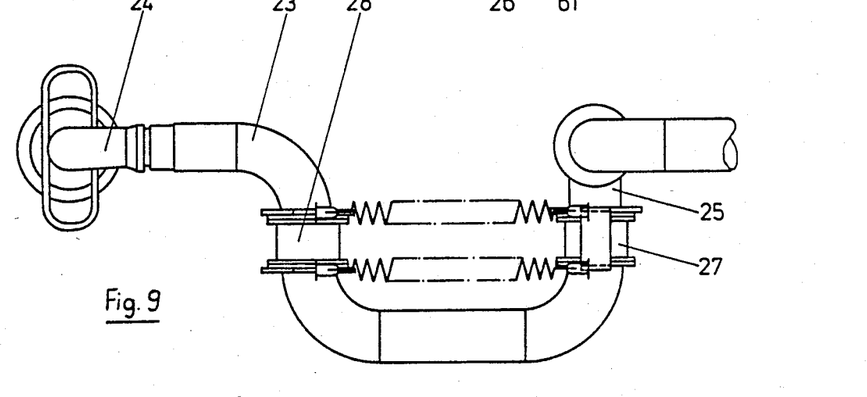
FIG. 9 is a side view of a portion of the fueling system of FIG. 1.
Figure 10:
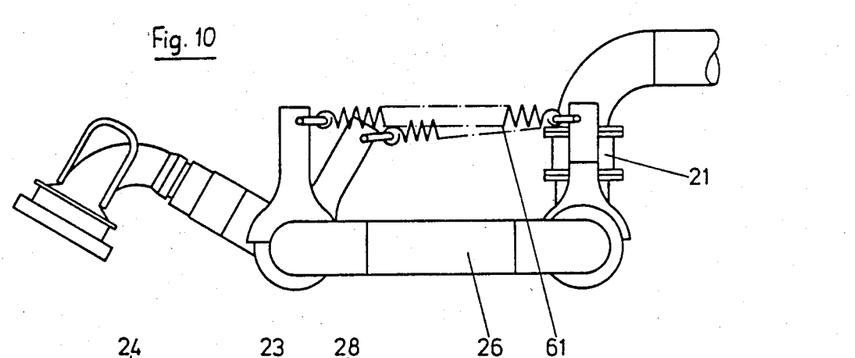
FIG. 10 is a top view of a portion of the fueling system of FIG. 1.

As shown in FIGS. 7 and 8, the vertically extending pipe section 31 has a fastening angle 54 fixedly connected thereto. The entire balance unit 40 is supported by the fastening angle 54. The spring package 41 acts against the fastening angle 54 and, through a draw rod 55 and the swivel joint 39, pulls on the diagonal tie 42. Thus, the pipe section 32 connected to the diagonal tie 42 is urged upwardly. Two guide bolts 56 are guided in respective guideways 57 in the fastening angle 22 and assure proper directional guiding of springs 58 of the spring package 41.

Diagonal tie 42 and draw rod 55 are connected by a bearing bolt 59. The adjusting of the tension of the spring package 41 is carried out using the adjusting mechanism 60, which includes a nut engaging a thread on the draw rod 55.

A fueling system according to the invention thus has the advantage that it can do without hoses and, in spite of this, can be connected by its filler-neck coupling to a tank coupling which has any desired orientation in space without applying a moment to the tank coupling, even though the pipe sections of the fueling system have nominal widths of 4" or more in order to permit quick fueling. Moreover, the fueling system is practically wear-free and maintenance-free and maintenance can be performed at those times when the coupling and the fittings must be serviced. As the swivel joints, nonlubricated and flanged swivel joints can advantageously be used, which like the pipe sections are made of high-quality steel.

Although a particular preferred embodiment of the invention has been disclosed in detail for illustrative purposes, it will be recognized that variations of modifications of the disclosed apparatus, including the rearrangement of parts, lie within the scope of the present invention.

The embodiments of the invention in which an exclusive property or privilege is claimed are defined as follows:

1. In a fueling system which includes a hydrant coupling which can be connected to a supply line, a filler-neck coupling which can be connected to a tank, and a plurality of pipe sections which are serially coupled to each other by respective swivel joints, the improvement comprising wherein:
   (a) said pipe sections of said fueling system include a center pipe section and two outer pipe sections, said center pipe section being connected to each of said outer pipe sections by a respective pair of said swivel joints, and said center pipe section being movably supported in the region of each end thereof by a respective wheeled carriage;
   (b) said center pipe section is elongate, has a bend in the region of each said end thereof, and has at each said end thereof a swivel joint which is a respective one of said swivel joints of a respective said pair and which has an axis of rotation which extends substantially vertically, the other swivel joint of each said pair having an axis of rotation which extends horizontally;
   (c) said outer pipe sections are each movably supported by a respective further wheeled carriage;
   (d) each said outer pipe section has at an end thereof remote from said center pipe section an end swivel joint having an axis of rotation substantially perpendicular to the center region of such outer pipe section;
   (e) said hydrant coupling is connected to one of a first pipe part which is pivotally coupled at its other end by a first swivel coupling to one end of a second pipe part which in turn is pivotally coupled by a second swivel coupling to one end of a third pipe part which is coupled at its other end to one of said end swivel joints, said first and second swivel couplings having axes of rotation which are perpendicular to the axis of rotation of said one of said end swivel joints; and
   (f) said fueling system includes a headpiece which includes said filler-neck coupling and which is connected to the other of said end swivel joints.

2. The fueling system according to claim 1, wherein said headpiece includes a line having five pipe sections which are connected with each other by four respective swivel joints which each have only one degree of freedom, said line having one end connected to said filler-neck coupling; wherein an end of said line remote from said filler-neck coupling is connected to said other end swivel joint of said fueling system; and wherein said headpiece is movable to a position in which the axes of rotation of three of said swivel joints thereof are parallel to one another and are perpendicular to the axes of rotation of the other two of said swivel joints thereof.

3. The fueling system according to claim 2, wherein said other end swivel joint has a substantially vertical axis of rotation when said fueling system is on a substantially flat surface.

4. The fueling system according to claim 2, wherein the axes of rotation of successive said swivel joints along said line of said headpiece are perpendicular to one another.

5. The fueling system according to claim 2, wherein a first of said pipe sections of said headpiece is connected to said other end swivel joint and is connected to a second of said pipe sections of said headpiece by one of said swivel joints thereof, and wherein said first and second pipe sections of said headpiece are each coupled to balance means for permitting a free pivoting of said first and second pipe sections relative to one another and for supporting the weight of each of the pipe sections of said headpiece other than said first pipe section.

6. The fueling system according to claim 5, wherein said balance means includes a diagonal tie and a spring package coupled to each other and respectively coupled to said second and first pipe sections, said diagonal tie being resiliently biased by said spring package.

7. The fueling system according to claim 6, wherein said balancing means includes means for adjusting the initial tension of said spring package.

8. The fueling system according to claim 1, wherein said other end swivel joint and a first of said swivel joints of said headpiece which follows said other end swivel joint in a direction of fluid flow are positioned so that one is above the other.

9. The fueling system according to claim 8, wherein the axis of rotation of a second said swivel joint of said headpiece which follows said first swivel joint thereof in the direction of fluid flow lies in a plane which also contains the axis of rotation of said other end swivel joint.

10. The fueling system according to claim 1, including a pull member arranged on said carriage of said outer pipe section to which said headpiece is coupled, said pull member having thereon a pull coupling.

11. The fueling system according to claim 1, wherein said carriages each have wheels which are trailing wheels.

12. The fueling system according to claim 1, wherein said carriages include means for releasably locking said trailing wheels in a given position.

13. The fueling system according to claim 1, including pressure-compensating means connected to and communicating with the interior of one of said pipe sections for compensating for pressure changes therein.

14. the fueling system according to claim 1, wherein one of a hydraulic filler valve, a volume counter and a Venturi pipe is provided in one of said pipe sections.

15. the fueling system according to claim 1, including balance means cooperable with a pipe section in the region of said hydrant coupling for counterbalancing the weight of said hydrant coupling and of a pipe section coupled thereto.

16. The fueling system according to claim 1, wherein said center pipe section and said outer pipe sections have substantially equal lengths, and wherein said fueling system can be moved to a collapsed condition in which said outer pipe sections are each adjacent and approximately parallel to said center pipe section.

17. The fueling system according to claim 1, wherein one of said center pipe section and said outer pipe sections has an escape valve, and wherein one of said center pipe section and said outer pipe sections has a discharge valve.

18. The fueling system according to claim 1, including support means on one of said outer pipe sections for supporting said headpiece when said fueling system is in a collapsed condition.

19. The fueling system according to claim 1, including fastening means on one of said outer pipe sections for supporting said hydrant coupling when said fueling system is in a collapsed condition.

20. A fueling system, comprising an elongate center pipe section, first and second wheeled carriages movably supporting said center pipe section at spaced locations therealong, a respective first swivel joint connecting each end of said center pipe section to a relatively short connecting pipe section, each said first swivel joint having a vertical axis of rotation, a respective second swivel joint connecting an end of each said connecting pipe section remote from said center pipe section to a respective elongate outer pipe section, each said second swivel joint having a horizontal axis of rotation, a respective third swivel joint provided at an end of each said outer pipe section remote from said center and connecting pipe sections, each said third swivel joint having an axis of rotation which is perpendicular to the axis of rotation of the second swivel joint at the opposite end of the associated outer pipe section, and third and fourth wheeled carriages which each movably support a respective said outer pipe section.

21. The fueling system according to claim 20, including a filler-neck coupling and a headpiece line which extends between and is connected to said filler-neck coupling and one of said third swivel joints, and including a hydrant coupling and a hydrant line which extends between and is connected to said hydrant coupling and the other of said third swivel joints.

22. The fueling system according to claim 20, wherein said center pipe section includes a center portion which extend horizontally and end portions which extend downwardly to said first swivel joints, wherein said connecting pipe sections are each curved to form a 90° arc, and wherein said outer pipe sections each have a 90° arcuate curve adjacent the associated second swivel joint, then extend substantially radially outwardly with respect to said second swivel joint, and then have a 90° arcuate portion which terminates in the associated third swivel joint.

* * * * *

UNITED STATES PATENT AND TRADEMARK OFFICE
CERTIFICATE OF CORRECTION

PATENT NO. : 4,658,873

DATED : April 21, 1987

INVENTOR(S) : Wolfgang VON MEYERINCK

It is certified that error appears in the above-identified patent and that said Letters Patent is hereby corrected as shown below:

Column 6, line 47; after "one" insert ---end---

Column 7, line 28; change "balancing" to ---balance---

Column 7, line 30; change "1" to ---2---

Column 7, line 48; change "1" to ---11---

Signed and Sealed this

Tenth Day of November, 1987

Attest:

DONALD J. QUIGG

Attesting Officer

Commissioner of Patents and Trademarks